United States Patent Office 3,286,331
Patented Nov. 22, 1966

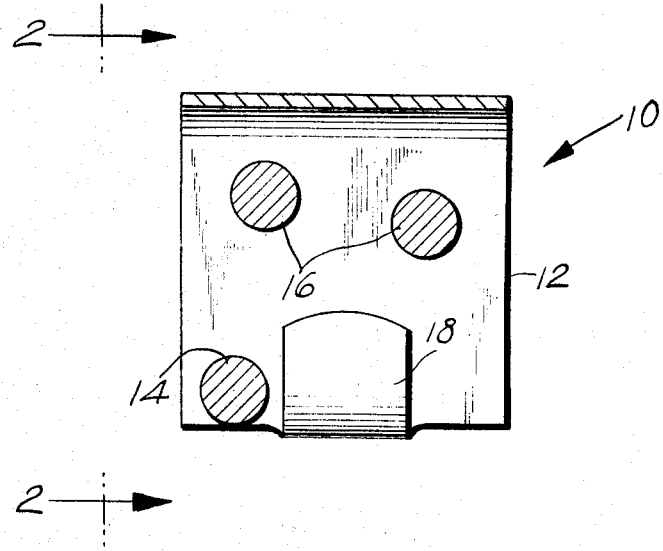
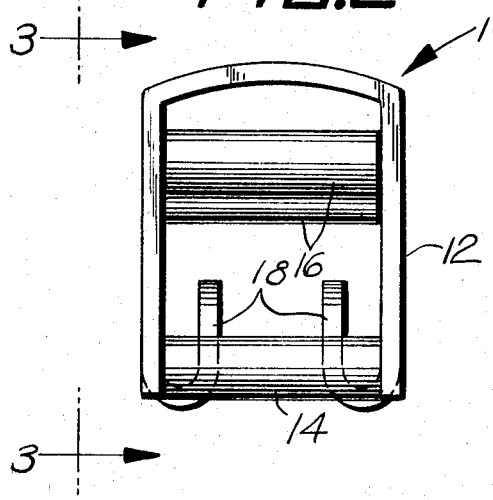
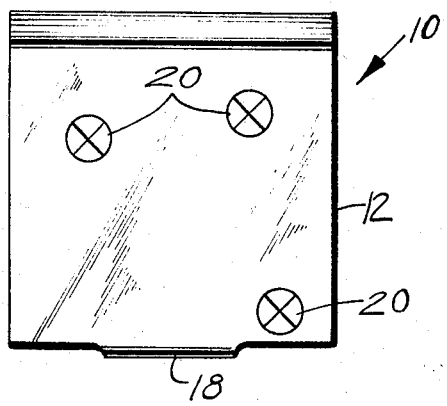

3,286,331
RUBBER LINER SPREADER
Ludie J. Wright, 732 W. Fort King St., Ocala, Fla.
Filed Jan. 14, 1964, Ser. No. 337,638
1 Claim. (Cl. 29—235)

This invention relates to hand tools, and more particularly to a tool for installing a rubber liner around the edges of sheet glass and the like.

It is a primary object of the present invention to provide a rubber liner spreader tool which will be used to install the rubber liner around the edges of sheet glass and will be of great use to plate glass installers enabling them to execute the job in a minimum amount of time with a minimum amount of effort.

A further object of the present invention is to provide a rubber liner spreader tool which will be small in size, simple in construction and will provide foolproof and troublefree operation when used for installing rubber liners on the edges of glass.

Other objects of the invention are to provide a rubber liner spreader tool bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a sectional view of the present invention;

FIGURE 2 is a view taken along the lines 2—2 of FIGURE 1;

FIGURE 3 is a view taken along the lines 3—3 of FIGURE 2.

Referring now more in detail to the drawing, a rubber liner spreader tool 10 made in accordance with the present invention is shown to include a U-shaped frame 12 made of metal or other suitable material. A roller 14 received between the sides of frame 12 provides means for guiding rubber liner spreader 10 when it is used for installation of rubber liners on the edges of plate glass or other material. A pair of spaced apart upper rollers 16 provide means for urging the rubber liner onto the plate glass. A pair of inwardly extending and spaced apart lips 18 of frame 12 provide a means for receiving the edges of the rubber lining and thus further aid as a guide means in conjunction with rollers 14 and 16. Rollers 14 and 16 are secured between the sides of frame 12 by a plurality of fasteners 20.

In operation, rubber liner spreader tool 10 is turned upside down and the rubber lining is pushed through to engage with rollers 16, and the sides of the rubber lining are received and retained by the lips 18 of frame 12.

Roller 14 is rested upon the edge of the plate glass with one hand urging downward on the rubber lining to keep it from sliding with tool 10, and as frame 12 is moved along the roller 14 in rolling engagement with the edge of the plate glass, the rubber lining is quickly and effortlessly placed upon the edge of the plate glass.

It shall be recognized that rollers 14 and 16 are freely rotatable upon fasteners 20 received in each end of rollers 14 and 16, providing for a smooth and effortless motion when using tool 10.

While various changes may be made in the detail construction, it shall be understood that such changes shall be within the spirit and scope of the present invention as defined by the appended claim.

What I claim as new and desire to protect by Letters Patent of the United States is:

A rubber liner spreader tool comprising of a substantially U-shaped frame providing handle grip means, a plurality of spaced apart rollers carried within said frame, said rollers adapted to secure the rubber liners on a plate glass, a pair of inwardly extending legs adapted to guide said rubber liner on said plate glass, said legs being secured to the bottom portion of said frame, the lower one of said rollers adapted to be engaged with the edge of said plate glass providing guidance and support means for said tool when in use, said lower roller adapted to rotate about its axis when engaged with said glass, at least one upper roller in rolling engagement with the outside surface of said rubber liner when said tool is in use, and said upper roller being adapted to engage said rubber liner to the edge of said plate glass, and a plurality of fasteners adapted to secure said upper and lower rollers within said frame.

References Cited by the Examiner
UNITED STATES PATENTS 2,635,332   4/1953   Huntington _____ 29—235
2,761,199   9/1956   Allen _____ 29—235
2,770,032   11/1956  Kelly _____ 29—235

WILLIAM FELDMAN, Primary Examiner.

J. C. PETERS, Assistant Examiner.